(12) United States Patent
Rathore et al.

(10) Patent No.: US 11,867,673 B2
(45) Date of Patent: Jan. 9, 2024

(54) NIR BASED REAL-TIME CONTROL OF LOADING IN PROTEIN A CHROMATOGRAPHY

(71) Applicant: INDIAN INSTITUTE OF TECHNOLOGY DELHI, New Delhi (IN)

(72) Inventors: Anurag Singh Rathore, New Delhi (IN); Garima Thakur, New Delhi (IN); Vishwanath Hebbi, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 200 days.

(21) Appl. No.: 17/436,599

(22) PCT Filed: Mar. 20, 2020

(86) PCT No.: PCT/IN2020/050264
§ 371 (c)(1),
(2) Date: Sep. 5, 2021

(87) PCT Pub. No.: WO2020/194343
PCT Pub. Date: Oct. 1, 2020

(65) Prior Publication Data
US 2022/0146416 A1    May 12, 2022

(30) Foreign Application Priority Data
Mar. 22, 2019   (IN) .............................. 201911011227

(51) Int. Cl.
*G01N 21/359* (2014.01)
*G01N 21/3577* (2014.01)
(Continued)

(52) U.S. Cl.
CPC ....... *G01N 30/8658* (2013.01); *G01N 30/466* (2013.01); *G01N 2030/746* (2013.01);
(Continued)

(58) Field of Classification Search
None
See application file for complete search history.

(56) References Cited

U.S. PATENT DOCUMENTS

| 7,901,581 B2 * | 3/2011 | Bryntesson ........ B01D 15/1828 |
| | | 210/659 |
| 2008/0135483 A1 | 6/2008 | Strube et al. |

(Continued)

OTHER PUBLICATIONS

Fahrner Robert L., and Gregory S. Blank "Real-time control of antibody loading during protein A affinity chromatography using an on-line assay." Journal of Chromatography A 849.1 (1999): 191-196.

(Continued)

*Primary Examiner* — Daniel S Larkin
(74) *Attorney, Agent, or Firm* — Blank Rome LLP

(57) ABSTRACT

The present invention relates to method of using spectroscopy for real time measuring of concentration of desired product and using measured data for monitoring and control of chromatography. It develops a method and system for measuring real-time concentration of clarified harvest and that of flow through of loading step of the chromatography and using measured data for determining breakthrough in real-time. The two modes of operation are used viz. first mode (Part A) uses a single near infrared spectroscopy (NIR) flow cell prior to the continuous chromatography column to ensure optimal loading in each cycle based on dynamic binding capacity studies carried out previously with the desired Protein A resin and second mode (Part B) uses two near infrared spectroscopy (NIR) flow cells, one before and one after the column, to detect the breakthrough curve (from 1% breakthrough onwards).

13 Claims, 8 Drawing Sheets

(51) Int. Cl.
*G01N 21/25* (2006.01)
*G01N 33/68* (2006.01)
*G01N 30/86* (2006.01)
*G01N 30/46* (2006.01)
*G01N 30/74* (2006.01)
*G01N 30/88* (2006.01)

(52) U.S. Cl.
CPC .................. *G01N 2030/889* (2013.01); *G01N 2030/8831* (2013.01)

(56) References Cited

U.S. PATENT DOCUMENTS

2012/0091063 A1* 4/2012 Bangtsson ........... B01D 15/428
210/96.1
2018/0339244 A1 11/2018 Hubbuch et al.

OTHER PUBLICATIONS

Godawal Rahul et al. "End-to-end integrated fully continuous production of recombinant monoclonal antibodies." J Biotechnol 213.suppl C (2015): 13-19.
Ruedt Matthias et al. "Real-time monitoring and control of the load phase of a protein A capture step." Biotechnology and bioengineering 114.2 (2017): 368-373.
Chmielowski, Rebecca A., et al. "Definition and dynamic control of a continuous chromatography process independent of cell culture titer and impurities." Journal of Chromatography A 1526 (2017): 58-69.
Search Report dated Jul. 20, 2020 in corresponding international application No. PCT/IN2020/050264.

* cited by examiner (a)

(b)

NIR BASED REAL-TIME CONTROL OF LOADING IN PROTEIN A CHROMATOGRAPHY

CROSS REFERENCE TO RELATED APPLICATIONS

This application is a national phase of PCT application No. PCT/IN2020/050264, filed Mar. 20, 2020, which claims priority to IN patent application No. 201911011227, filed Mar. 22, 2019 which is incorporated herein by reference thereto.

TECHNICAL FIELD OF THE INVENTION

The present disclosure relates to a system for monitoring and control of concentration of a feed material containing a bio-molecule in chromatography apparatus. The present invention discloses a system of using spectroscopy for real time measuring of concentration of the desired material and using the measured data for monitoring and control of chromatography.

BACKGROUND OF THE INVENTION

In the current biopharmaceutical landscape, the monoclonal antibody (mAb) based therapies suffer from poor affordability in developing countries due to high manufacturing costs and multiple dosage requirements. Manufacturing flexibility is being increasingly regarded as desirable by biopharmaceutical manufacturers. Thus, there is a growing focus on process intensification through continuous manufacturing of biopharmaceuticals to lower production costs. Continuous processing provides multiple advantages including reduction in the scale and footprint of manufacturing plants, reduced process costs, and the ability to cope with variable market demand. The United States Food and Drug Administration (USFDA) encourages continuous manufacturing and related process analytical technology (PAT), identifying them as opportunities to increase the flexibility, efficiency and robustness of biopharmaceutical production processes.

Continuous manufacturing of mAbs have been achieved through perfusion cell culture, with modern process with product titers routinely above 5 mg/mL. Continuous production of such high titer clarified cell culture harvest fluid must be followed by robust continuous downstream purification. Downstream purification, consisting of clarification, capture, polishing, and formulation, can contribute to 60-80% of total mAb production costs. Up to 60% of these downstream costs are due to chromatography steps. Protein-A chromatography is a key downstream unit operation for capturing a single target monoclonal antibody (mAb) product from clarified cell culture harvest fluid containing thousands of other proteins. Capture chromatography contributes significantly to these costs as Protein-A resins cost nearly an order of magnitude more than other resins due to the difficulty of producing and immobilizing the Protein-A affinity ligand on the surface of the resin particles. Protein-A columns also have to handle large volumes of harvest with significant impurity content, and must go through multiple column cleaning and washing cycles which lead to ligand degradation and reduction of binding capacities. Thus, optimization and control of the protein-A step is a key part of lowering manufacturing costs.

Some of existing technologies used for continuous chromatography are Cadence BioSMB (Pall Life Sciences, USA), Akta PCC 75 (GE Life Sciences, Sweden), Bio SC Lab (Novasep Inc., France), and Multicolumn Countercurrent Solvent Gradient Purification (MCSGP) Contichrom system (Chroma Con AG, Switzerland). These technologies facilitate the use of periodic multi-column switching methods to enable loading, elution, wash, cleaning and equilibration steps with continuous cycling between columns. There are two competing challenges in establishing a control system for continuous Protein-A chromatography. Firstly, since Protein-A resin is expensive and suffers degradation during wash and cleaning cycles. Further, loading up to dynamic binding capacity is desired in each cycle to maximize resin utilization. As, the dynamic binding capacity is highly dependent on residence time, flow rate and the number of column cycles, which result in complexity. Secondly, cycle times should also be fixed, as the elution from the Protein-A step must be continuously directed further downstream for smooth unit operations.

One kind of existing technique uses protein-A high pressure liquid chromatography (HPLC) for determining column breakthroughs as low as 1%, using a 2-minute long analytical method provided in the *Journal of Chromatography A*, vol. 849, pp. 191-196, 1999, made by R. L. Fahrner and G. S. Blank titled "*Real-time control of antibody loading during protein A affinity chromatography using an on-line assay*". The limitation of the aforesaid technique is that the analysis time is too long for real-time decision making. In a scenario where the concentration of the protein-A in load tank is changing continuously, fast and accurate real-time decisions are not possible with this method, leading to suboptimal loading and potential product loss during analysis.

Another kind of existing technique uses an end-to-end continuous mAb platform with time-based loading or volume-based loading. Publication titled "*End-to-end integrated fully continuous production of recombinant monoclonal antibodies*," by R. Godawat, K. Konstantinov, M. Rohani, and V. Warikoo, in *Journal of biotechnology*, vol. 213, pp. 13-19, 2015 discloses above mentioned technique. This technique requires the mAb titer to be fixed so that it can be used beforehand to calculate the amount of Protein A load based on binding capacity. While this will work for batch processing, such a system will be suboptimal when performing continuous processing as real time process variations occur.

Another kind of existing technique includes analyzing of the mAb concentration in the harvest fluid by using multi-wavelength spectroscopy combined with multivariate data analysis. A publication titled "*Real-time monitoring and control of the load phase of a protein A capture step*" by M Rüdt, N. Brestrich, L. Rolinger, and J. Hubbuch in *Biotechnology and Bioengineering*, vol. 114, pp. 368-373, 2017 discloses aforementioned technique and a system where Partial Least Squares Regression (PLS) modeling on UV/Vis absorption spectra was applied to quantify mAb in the effluent of a Protein A capture step during the load phase. This technique is used in real time to monitor and control loading by predicting the mAb concentration in the effluent and terminating loading at a certain breakthrough level. As, the system uses different MVDA PLS models for different harvest concentration regimes, and hence may be difficult to apply in the case of large concentration variations transitioning across different regimes. It has also only been demonstrated for step changes in concentration which may not be the case for real process deviations, and has not been demonstrated in a continuous chromatography system.

Another kind of existing technique, known as the delta UV method, involves measuring the difference in reading of UV detectors positioned before and after the column in the loading zone to calculate column breakthrough. A publication by R. A. Chmielowski, L. Mathiasson, H. Blom, D. Go, H. Ehring. H. Khan, et al., titled "*Definition and dynamic control of a continuous chromatography process independent of cell culture titer and impurities,*" in *Journal of Chromatography A*, vol. 1526, pp. 58-69, 2017 discloses a continuous loading strategy for PCC that is independent of cell culture background and encompasses cell culture titers up to about 31 g/L. In this method, when the percentage breakthrough reaches the target, loading up to the desired binding capacity is implied and the loading cycle ends. The disadvantages associated with this method are possibility of unequal detector drifts and baseline drifts that can arise due to nonlinear changes in HCCF (Harvested cell culture fluid). Also, the system can only operate up to a maximum of four columns. Addition of more columns will require more UV detectors, increasing the cost of the system and making it more vulnerable to drift. Further, the delta UV method cannot be applied to other continuous chromatography systems which limit its applicability.

It is evident from the above that different techniques/methods and systems have been used for continuous chromatography. However, these techniques/methods and the systems are associated with several disadvantages such as high manufacturing costs, complexity, suboptimal loading, potential product loss during analysis, non-universality equipment, limitations on the total number of columns, and limitations on the detectors present in the equipment. Hence, a system is required for the monitoring and controlling the continuous chromatography in real-time which can handle deviations during continuous operations.

OBJECTIVES OF THE INVENTION

An objective of the present invention is to provide a system for measuring the real-time concentration of clarified cell culture harvest/feed material containing a protein and utilizing the measured data for making real-time loading decisions for chromatography.

Another objective is to provide a system for measuring the real-time concentration of clarified harvest/feed material containing a bio-molecule and that of flow through of the loading step of the chromatography and using the measured data for determining breakthrough in real-time to utilize the breakthrough values to make real-time decisions for switching of columns for different steps in continuous operation of chromatography.

SUMMARY OF THE INVENTION

The present disclosure provide a system for monitoring and control of concentration of a bio molecule in a chromatography apparatus, the chromatography apparatus comprising a reservoir (1) for storing a feed material containing the bio-molecule; a continuous multi-column chromatography system (2) capable of isocratic or gradient operation, the system (2) compatible with organic solvents, aqueous solutions or mixtures of both comprising; a plurality of fluid transmission channels, where each channel is connected to a control-system-operable pump (20) at an inlet for regulating and controlling a flow of fluid within the channel; at least the feed material feeding channel (3), where the channel has control-system-operable pump (20) at an inlet for feeding the feed material within the channel; and a plurality of columns (4), each column having an inlet and an outlet, wherein the inlet is connected through one of a plurality of pneumatically or electronically actuated valves (21) of the channels of the system (2) to one of the control-system-operable pump (20) and the outlet is connected through one of a plurality of pneumatically or electronically actuated valves (22) to a plurality of outlet ports (5) of the system (2), characterized by a first control system (6) connected to the system (2) for operating the plurality of the pumps (20) and the valves of the apparatus; one or more NIR flow cells (7, 9), configured for analyzing spectra of the feed material to measure concentration of bio molecule in the feed material, and/or for determining concentration of the bio molecule at the outlet of one or more of the columns (4) to determine breakthrough of the feed material, and communicating to the chromatography system (2) and/or secondary control system (8); the secondary control system (8) in communication with one or more NIR flow cells (7, 9) and the first control system (6), for transferring the NIR spectroscopy data to the first control system (6) for electronically or pneumatically actuating supply of the feed material from the reservoir (1) to one of the columns; and the first control system (6) continuously processing the data from the NIR flow cells (7, 9) or the secondary control system (8) to change valve configuration, pump actuation, flow rate of feed material or a fluid to carry out steps selected from the group consisting of loading, second-pass loading, wash, elution, cleaning, regeneration, and equilibration to increase resin utilization, reduce idle time, or take control actions to handle system errors.

In still another embodiment, the present disclosure provides that the bio molecule is a protein or peptide.

In yet another embodiment, the present disclosure provides that the fluid is an equilibration buffer, elution buffer, cleaning buffer or washing buffer.

In still another embodiment, the present disclosure provides that the first control system (6) and the secondary control system (8) comprise a computer, distributed control system or processing device.

BRIEF DESCRIPTION OF THE ACCOMPANYING DRAWINGS

FIGS. 3(a) and 3(b) illustrates PLS models built using TQ Analyst 9.5 software (Thermo Scientific, USA).

Figure 4:
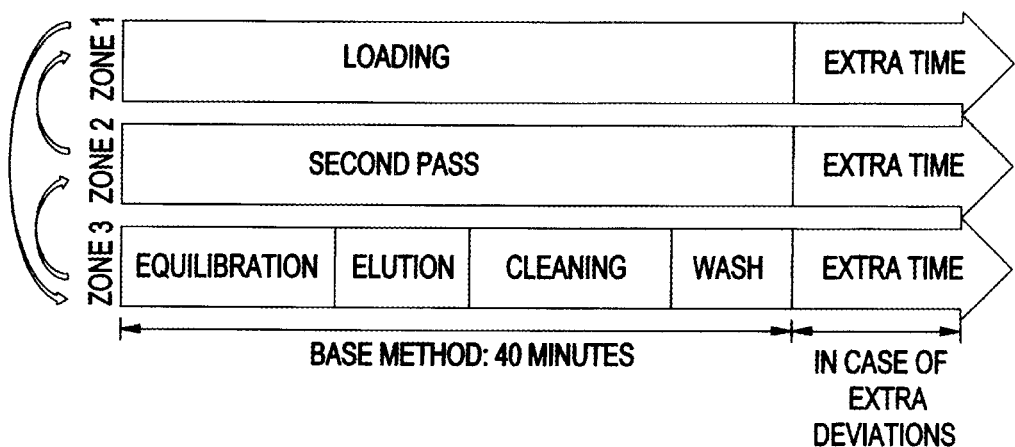

FIG. 4 illustrates a 3-column method developed to facilitate continuous loading.

Figure 5:
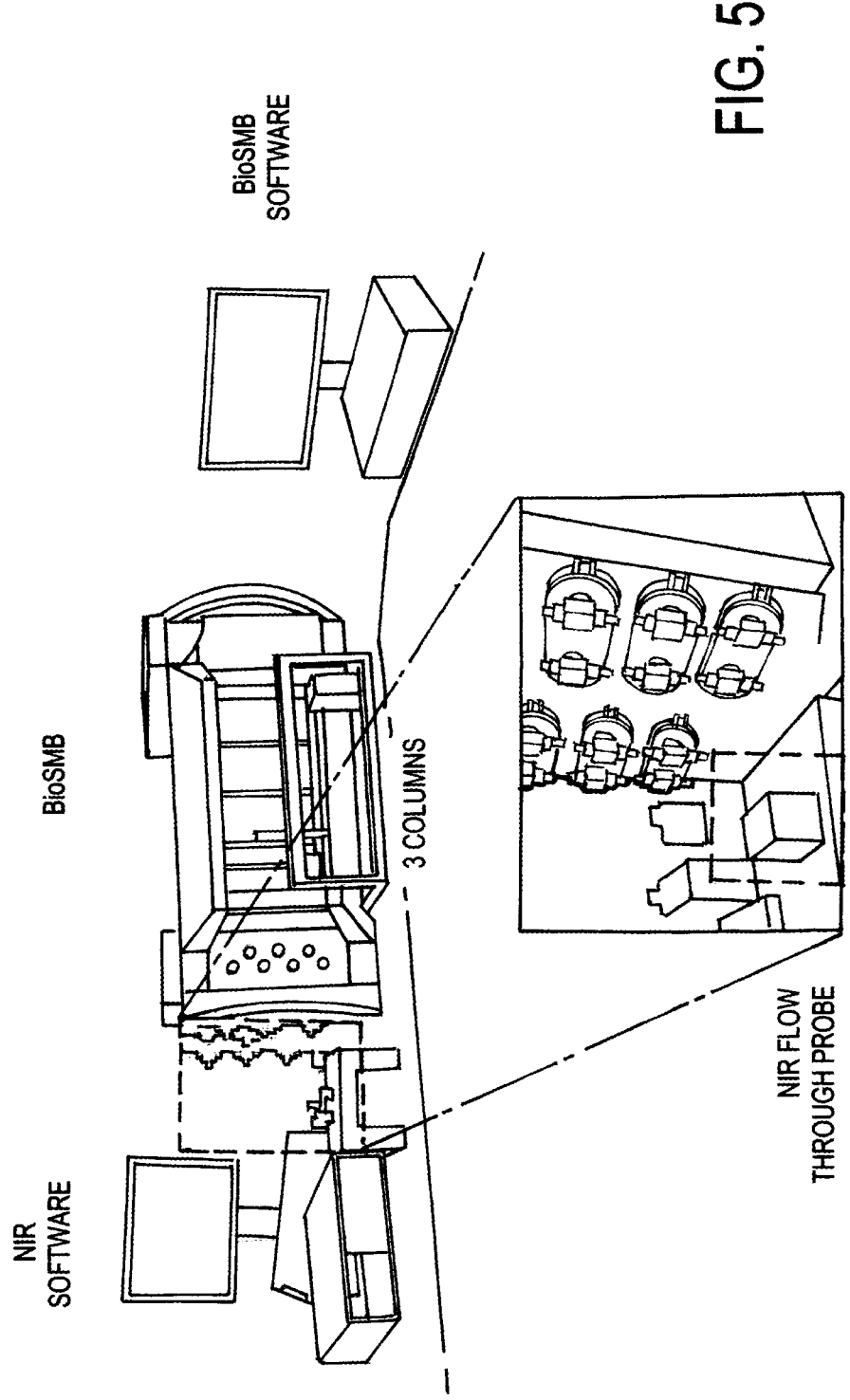

FIG. 5 is an image of an example control setup.

Figure 6:
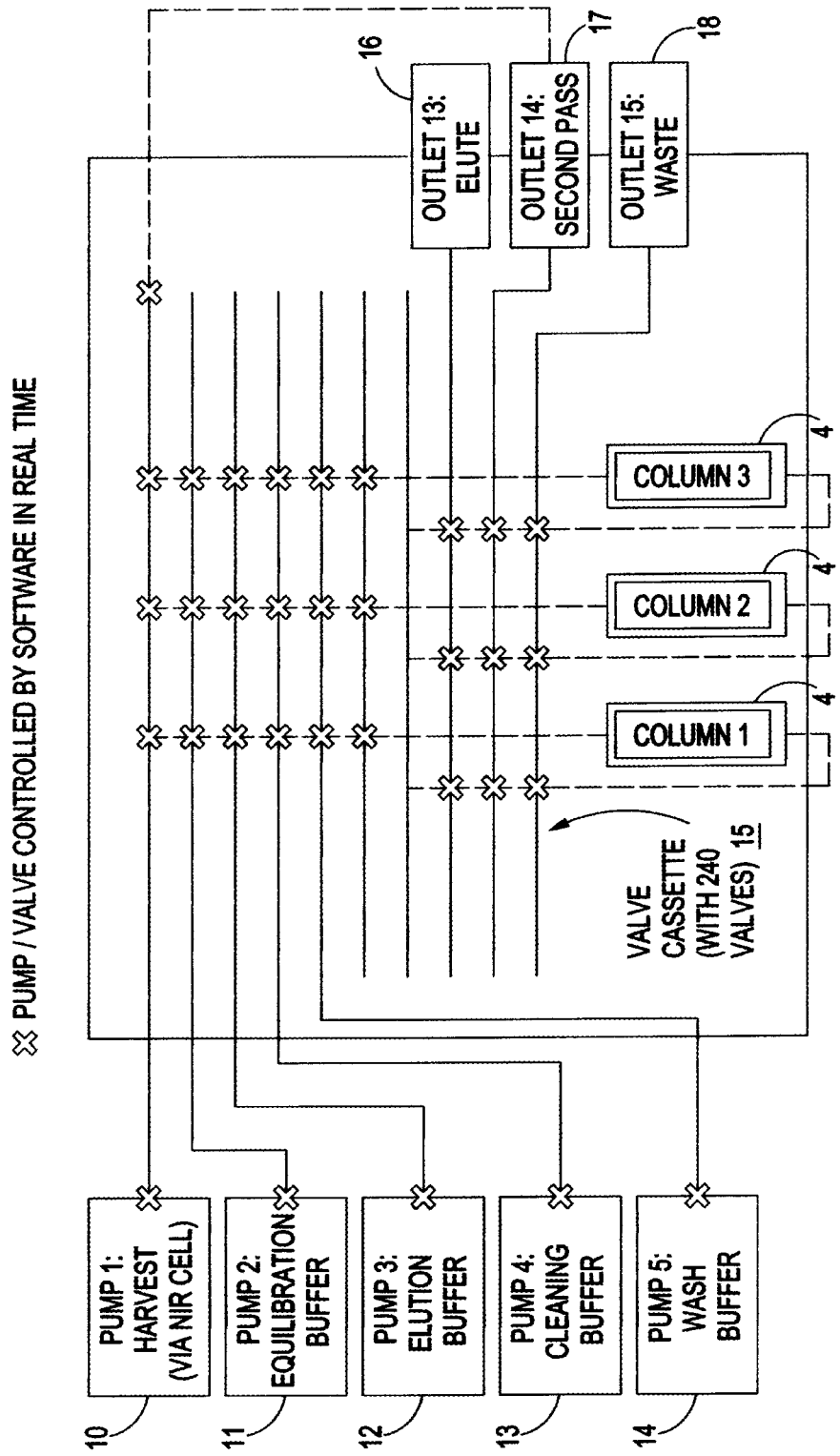

FIG. 6 illustrates an example of control system architecture.

Figure 7:
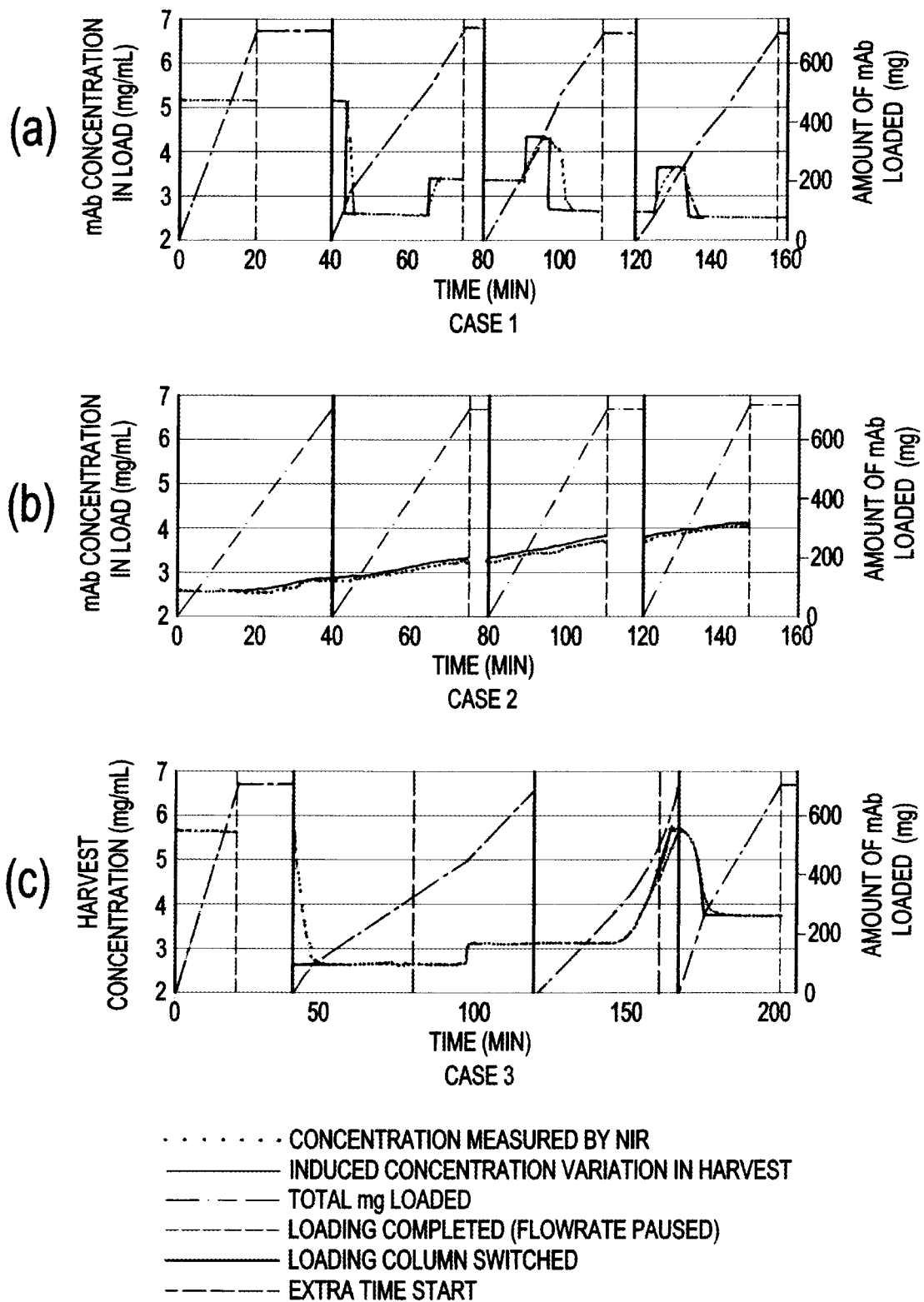

FIG. 7 illustrates the control system (2) response to induced variations in feed material concentration for case 1, case 2 and case 3 in the case of Setup A which has only one NIR flow cell (7).

Figure 8:
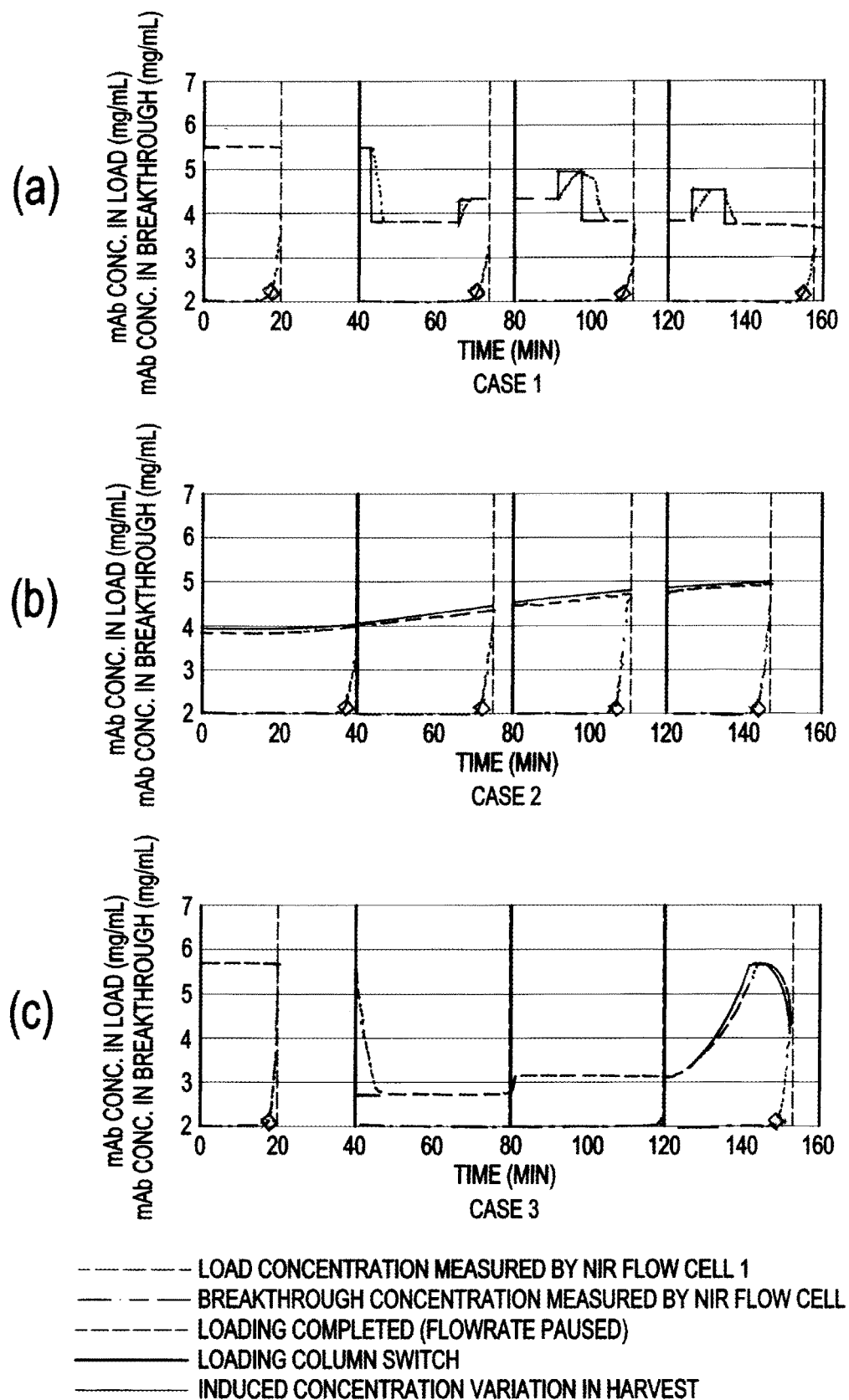

FIG. 8 illustrates the control system (2) response to induced variations in feed material concentration for case 1, case 2 and case 3 in the case of Setup B which has only two NIR flow cell (7, 9).

Figure 9:
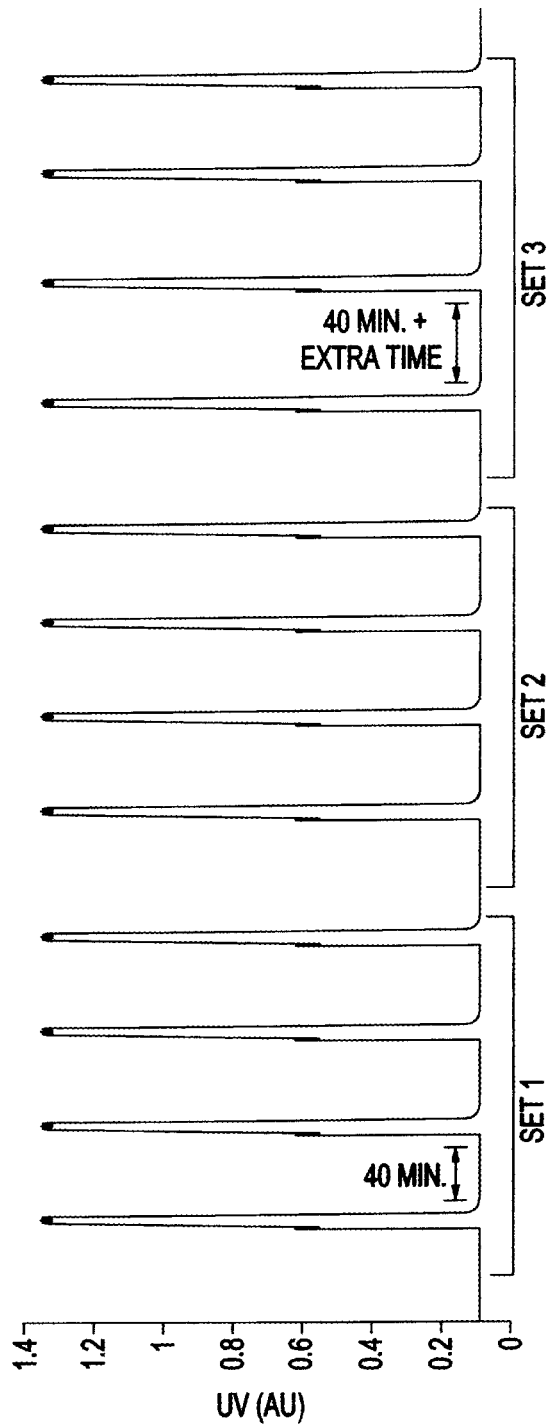

FIG. 9 illustrates the elution chromatograms of all 24 cycles.

DETAILED DESCRIPTION OF THE INVENTION WITH REFERENCE TO ACCOMPANYING DRAWINGS

Provided below is a non-limiting exemplary embodiment of the present invention with described reference of the accompanying drawings.

In present invention a system has been developed for measuring the real-time concentration of clarified cell culture feed material containing a protein and utilizing the measured data for making real-time loading decisions for chromatography. The present disclosure further provides a system for measuring the real-time concentration of clarified feed material and that of flow through of the loading step of the chromatography and using the measured data for determining breakthrough in real-time so that the breakthrough values to make real-time decisions for switching of columns for different steps in continuous operation of chromatography.

In the present invention, two modes of operation are used. The first mode (Part A) uses a single near-infrared spectroscopy (NIR) flow cell (7) prior to continuous multi-column chromatography system (2) to ensure loading up to desired binding capacity in each cycle based on dynamic binding capacity studies carried out previously with the desired Protein A resin. The second mode (Part B) uses two near-infrared spectroscopy (NIR) flow cells (7, 9), to detect the breakthrough curve (from 1% breakthrough onwards). These two NIR flow cells (7, 9) are sufficient to measure loading and breakthrough to/from any of the multiple columns by manipulating the multi-column chromatography system (2) valves or pumps, which gives flexibility to direct flow streams to any outlet along a wide range of flow paths as desired by the user. The Python code within a first control system (6) is able to leverage the flexibility of the multiple valves and pumps as it operates outside the restrictions of the inbuilt multi-column chromatography system (2), which only allows a plurality of pneumatically or electronically actuated valves switching at predetermined times as specified by the pre-loaded method, and not dynamically based on real-time signals.

The concentration of mAb in feed material is measured to within 0.02 mg/mL every two seconds using the NIR sensor, regardless of the variations in concentrations of host cell proteins and other impurities. This fast, real-time concentration measure is then used to control the loading time in the three-columns (4) on the multi-column chromatography system (2). In Part A, loading is done up to a desired binding capacity, experimentally determined over a range of feed material concentrations and residence times. The total time and amount of loading are controlled in real time. In Part B, the flow through of the loading column is directed to the second-pass column once 1% breakthrough is detected by the second NIR flow cell (9) placed at the outlet of the columns (4). This ensures minimal fouling of the second pass column as the foulants prior to 1% breakthrough were not loading onto the second pass column. Also, loading is stopped once 80% breakthrough is detected by the second NIR flow cell (9) placed after the columns (4). Breakthrough decisions can be made at any percentage breakthrough desired. All breakthrough percentages are calculated as the percentage difference in concentration measured by the NIR flow cells (7, 9) before and after the columns (4).

The robustness of the present system has been extensively tested in twelve cycles with deliberately induced variations perturbations in the feed material concentration separately in both modes of operation (Part A and Part B). Consistency in critical quality attributes of the pooled product and elution time has been demonstrated for all cases, including step, linear and nonlinear concentration changes, as well as in the case of extreme deviations of harvest concentration outside the normal operating range. The system has been designed not only for improved resin utilization across multiple cycles, but also to enable consistent and periodic elutions so that the downstream unit operations can run smoothly. The variations induced to test the control system have also been selected to reflect deviations that could occur in an upstream perfusion process. The proposed system is an advanced spectroscopy-based PAT tool that facilitates both real time monitoring and control of critical process parameters, and is very well suited for implementation in a continuous mAb production train. It is also easily adaptable to any continuous chromatography system.

A NIR based process control scheme following the tenets of PAT has been proposed for enabling continuous operation of Protein-A or bio-molecule chromatography. There are two setups, Setup A and Setup B, which are identical except that Setup A has a single NIR flow cell (7) and Setup B has two NIR flow cells (7,9). A near-infrared flow through first NIR flow cell (7) placed before the load zone is used to collect spectra of the feed material every three seconds. A second NIR flow cell (9) is connected to the outlet of the chromatography columns for determining concentration of the bio molecule at the outlet of one or more of the columns (4) to determine breakthrough of the feed material from the loading column. The spectra from the NIR flow cell(s) are passed to online MVDA model(s) calibrated with reference spectra that is able to determine the concentration of the feed material containing protein to within ±0.01 mg/mL. The second control system (8) or processing device (8) in communication with the flow cells (7,9) collects concentration data via a software code. The second control system (8) pass the data to software of first control system (6) which operates the pumps and valves of the continuous multi-column chromatography system (2) and adjusts loading time depending on the feed material concentration in real time. The flow rate calculation algorithm takes into account dynamic binding capacity at a certain concentration and residence time. The normal operating range of the system allows for concentration variations in the feed material between 1 mg/mL and 10 mg/mL.

The response of the present system for monitoring and control to a range of variations in feed material concentration has been examined. The induced variations have been designed to model possible deviations that can potentially occur during a perfusion process. In all cases, when the variations are within the normal operating range of the system, loading up to maximum dynamic binding capacity is achieved and elution yields are consistently above 96 percent. The present system is also able to handle extreme deviations when the concentration dropped below the normal operating range by dynamically adjusting the times of the various steps of the 3-column method.

The present system is very well suited for implementation in a continuous mAb train. It is unique in its ability to simultaneously assure both targeted resin utilization and consistent elution times. Resin costs are minimized and predictability is granted to elution time and quality, which is essential for the control of processes further downstream. It is also easily adaptable to any continuous chromatography system with multiple columns and valves. The control system embraces the PAT framework for continuous manufacturing, using online measurements of critical process parameters to make real-time control decisions for increased efficiency, flexibility and agility of the Protein A chromatography process in the case of unexpected process deviations.

Figure 1:
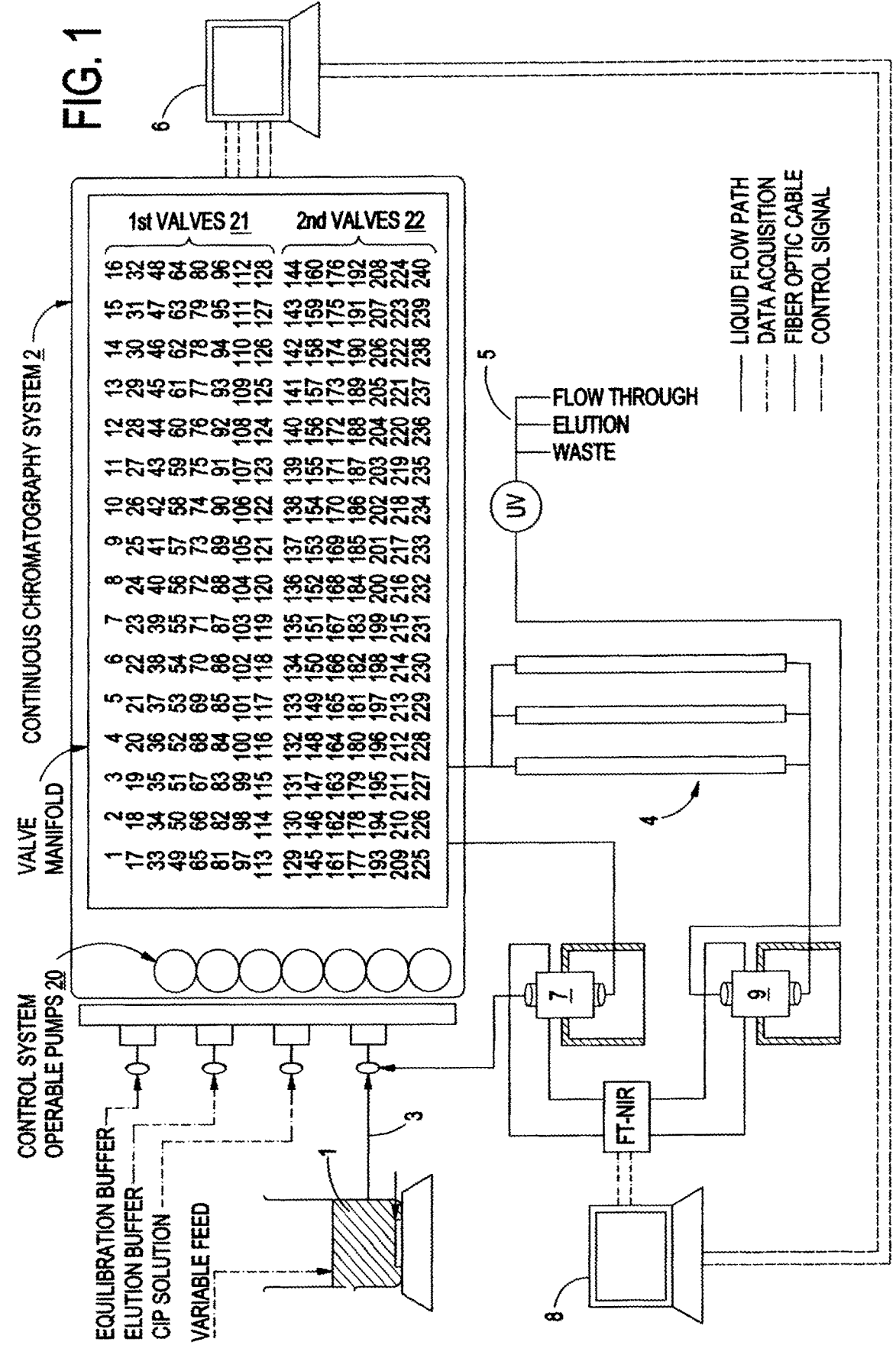
FIG. 1 illustrates the schematic view of a continuous chromatography control system with one or two NIR flow cells.

FIG. 1 shows a schematic view of a chromatography control system. The system comprises a reservoir (1) with mixing in stirrer in which feed is introduced. The source of feed material in the reservoir can be any upstream protein production system, such as a fed-batch or perfusion bioreactor. The feed is pumped through one of the control system operable pumps (20) of the continuous multi-column chromatography system (2) into first flow cell (7) and then into the columns (4). Fiber optic cables connect the flow cell (7) to an NIR system. The signal from the flow cell (7) is acquired by the FT NIR computer/second control system (8). The FT NIR computer/second control system (8) is further connected to the first control system (6) through a LAN cable or other communication protocol. This allows continuous real time data flow between FT NIR computer/second control system (8) and the first control system (6). The feed and buffers are pumped into the valve manifold of the multi-column chromatography system (2). The first control system comprises a computer (6) loaded with the Python software which continuously acquires the data from FT NIR computer (8) through the LAN cable or other communication protocol and operates the valves and pumps of the system (2) according to the control algorithm described in the following sections.

The feed is characterized as having mAb concentration of 6.3 mg/mL and host cell protein (HCP) content of 80,000 ppm. The feed is then thawed at 4° C. and then brought to room temperature before being filtered with a 0.22 pm filter. Three columns of 16.67 mL packed with MabSelectSure™ resin are used. The columns are equilibrated with 20 mM phosphate and 150 mM NaCl buffer at pH 7.4. The columns are loaded with filtered feed. The unbound material is washed with equilibration buffer. Product is eluted using 100 mM glycine-HCl buffer at pH 3.5. The columns (4) are then cleaned in place with 50 mM NaOH and 1 M NaCl cleaning buffer. Continuous runs are performed using a BioSMB (Pall Life Sciences, USA) which is the system (2) in this example.

Figure 2:
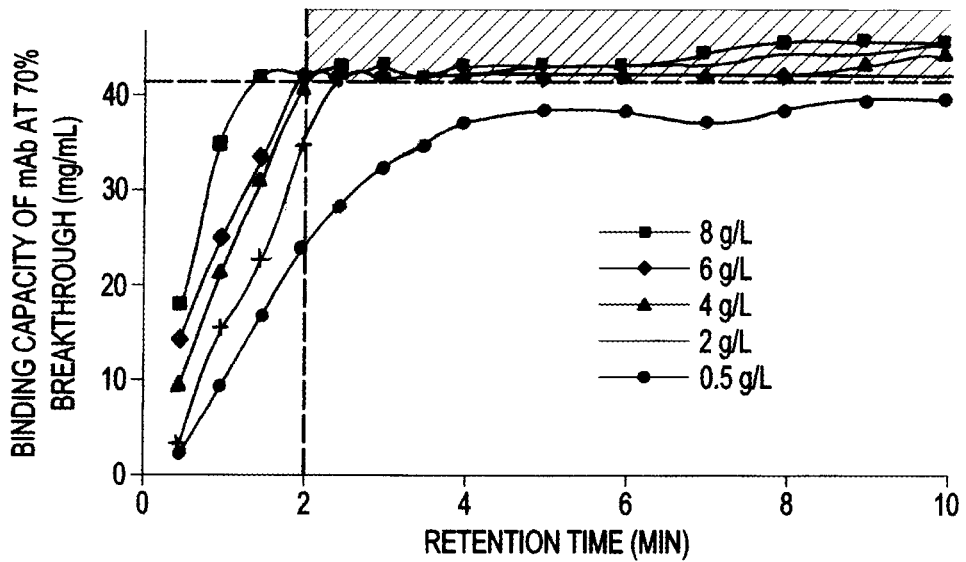
FIG. 2 illustrates a dynamic binding capacity studies at 70% breakthrough of feed material containing protein on MabSelectSure™ resin.

FIG. 2 shows a dynamic binding capacity studies at 70% breakthrough of mAb feed on MabSelectSure™ resin. The shaded area shows the normal operating range of the loading control system. The columns (4) are loaded based on dynamic binding capacities (DBC) at 70% breakthrough, pre-determined using adsorption isotherms for variable feed concentrations and residence times. For concentrations in the range of 2 to 8 mg/mL, residence time from 2.5 to 10 minutes assured binding capacity of 42-45 mg/mL which is the operating range of the present system. Constant binding capacity of 42 mg/mL is used for the control algorithm as long as operation is within this range.

The NIR calibration library and online application developed using an Antaris™ II FT-NIR Analyzer from Thermo Scientific, USA. The spectra are collected by using a Series 750 Transmission Flow Cell from Thermo Fisher Scientific, USA. All spectra are collected in the range of 4000 cm$^{-1}$ to 11000 cm$^{-1}$. Calibration spectra are collected in triplicate, each averaged over 16 scans at 2 cm$^{-1}$ resolution.

Figure 3:
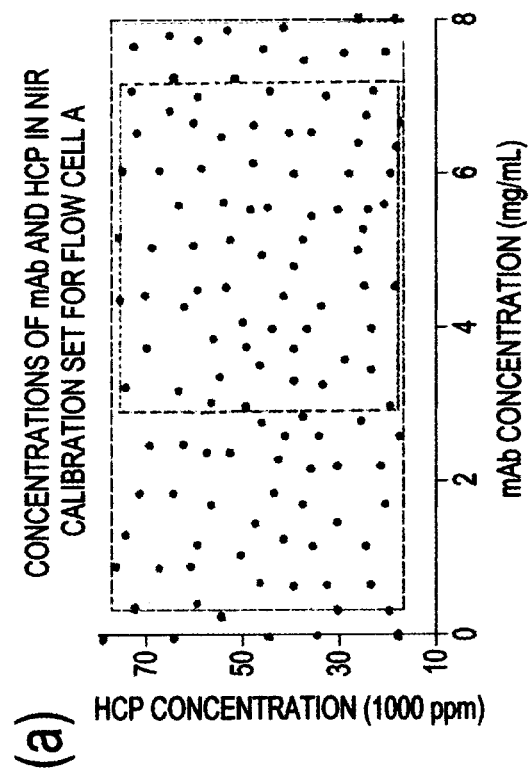
Figure 3:
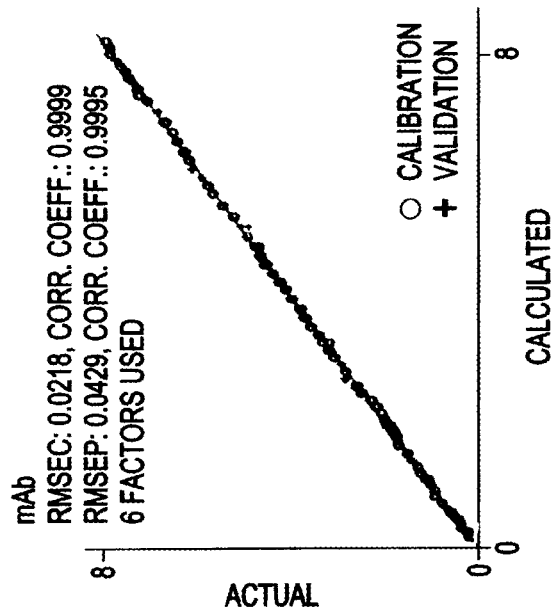
Figure 3:
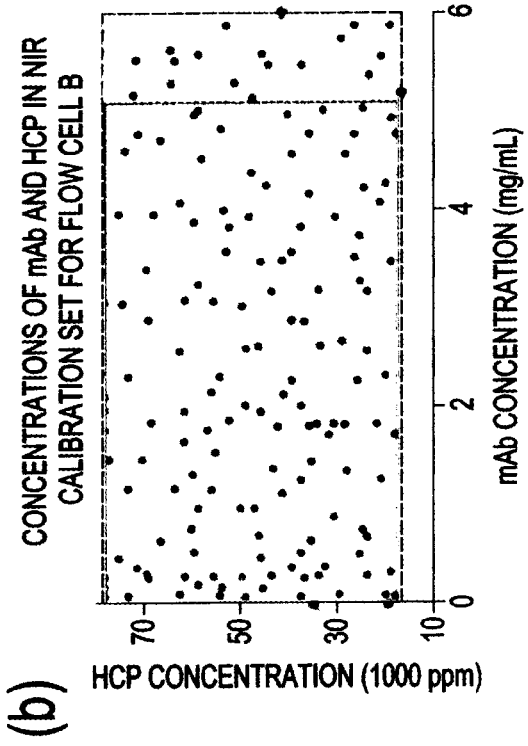
Figure 3:
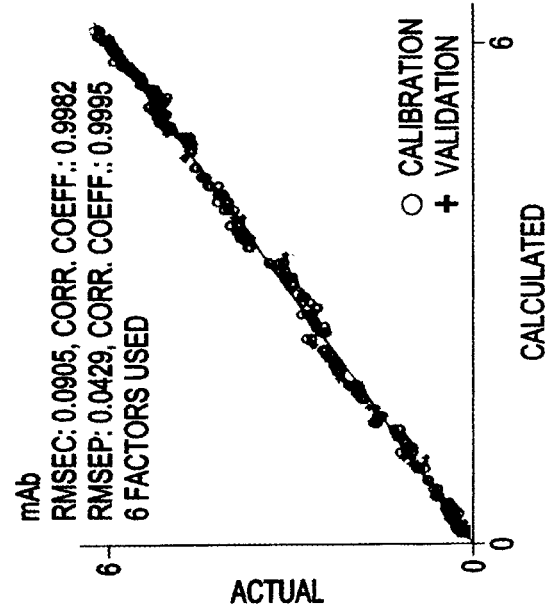

FIG. 3 shows PLS (Partial least squares regression) models built using TQ Analyst 9.5 software (Thermo Scientific, USA) for NIR flow cell 7 (FIG. 3(a)) and NIR flow cell 9 (FIG. 3(b)). Preparative protein-A chromatography at 20 mL scale is used to generate concentrated pools of mAb (8.5 mg/mL mAb) and HCP (80000 ppm HCP) from the feed fluid. These are used for spiking the harvest to prepare 105 calibration standards for the NIR library. In this case, it is desired to cover harvest concentration variability from 0.5 mg/mL to 8 mg/mL mAb, and 20000 to 80000 ppm HCP. Triplicate spectra are averaged and a 7-point Savitsky-Golay smoothing filter is applied. Calibration models are fitted in the region of 5200 cm$^{-1}$ to 8000 cm$^{-1}$, where protein signals are prominent and internally and externally validated. The area shaded in grey shows the normal operating range of load variations, and the larger white boxed areas shows the total measurement range of the =models for the NIR flow cells (7, 9). The plots on the right shows that high correlation coefficients are obtained for the models. The models are saved as a method file, and is imported into the real-time spectral collection and processing workflow using Result Integration software from Thermo Fisher Scientific.

FIG. 4 shows a 3-column method developed to facilitate continuous loading. The proposed method addresses several constraints. Firstly, time matching of the five chromatography steps (loading/second-pass loading, wash, elution, cleaning, and re-equilibration) is required. Since loading is chosen as the determining step, the time of loading must equal the combined times of the other four steps. Secondly, a minimum residence time of 2.5 minutes is required, effectively limiting the maximum flowrate to 6.67 mL/min for the given column size. Thirdly, the loading pumps had an accuracy constraint of 2 mL/min for the minimum flowrate. Lastly, loading up to DBC (Dynamic binding capacity) of 35 mg/mL (FIG. 1) desired for each cycle.

As shown in Table 1, a basic 3-column method is developed with a determining step duration of 40 minutes. Elution is carried out in 8 CVs at a flowrate of 7.9 mL/min, followed by cleaning with 50 mM NaOH with 1M NaCl for 15 minutes at a flowrate of 3.4 mL/min as recommended for MabSelectSure™ resin. Equilibration and re-equilibration are both performed in 2 CVs at a flowrate of 7.9 mL/min flowrate. With this base method in place, the loading flowrate was allowed to vary within a set range over a period of 40 minutes, without disturbing the operation of the other steps. In this case, the constraints and column parameters allow load flowrate variation between 2 mL/min and 6.67 mL/min. As per Equation 1, this allows protein concentration variation between 2.2 mg/mL and 7.3 mg/mL to be handled by the system.

$$Flowrate = \frac{\text{total column dynamic binding capacity} - \text{mg loaded}}{(40 \text{ min} - \text{total min elapsed}) \times \text{current concentration}} \quad (1)$$

Where, mg loaded=$\Sigma_n$ concentration×flowrate×time and n is the number of concentration changes in the current load phase.

As long as the concentration variation is within this range, consistent loading can be achieved without having to change the base timings of the PCC method. When a concentration change is detected, the loading pump compensates instantly based on the linear real-time response function in Equation 1.

TABLE 1

Specifications of the BioSMB PCC method operated by the control system

| PCC step | Number of CVs | Total volume (mL) | Flowrate (mL/min) | Time (min) |
|---|---|---|---|---|
| Loading | Concentration-dependent, ≤16 | Concentration-dependent, ≤268 | 6.7 (constant except when loading pump is paused) | Concentration-dependent, ≤40 |
| Wash | 2 | 33 | 7.9 | 4 |
| Elution | 8 | 133 | 7.9 | 17 |
| Cleaning in place | 3 | 50 | 3.4 | 15 |
| Equilibration | 2 | 33 | 7.9 | 4 |

Once the NIR calibration library is developed offline over the range of interest (0.5 mg/mL to 8 mg/mL of mAb) using TQ Analyst 9.5 software, the calibrated model was integrated with the online spectral collection protocol developed using Result 3 SP11 software (Thermo Scientific, USA). An online transmission NIR flow-cell was used to collect spectra every 3 seconds (average of 3 scans at 2 cm$^{-1}$ resolution) from the process flow stream. The calibrated model is immediately applied to each spectrum, providing the concentration of the flow stream as well as spectral quality parameters. A quality check based on spectral similarity to the library standards was added at this point, to prevent noisy data being passed to the continuous multi-column system (2) control algorithm. Around 97% of all collected spectra (out of a total of 11,583 collected over the three testing cases passed the quality check which are described later).

As shown in FIG. 1, the concentration data from the NIR flow cells (7, 9) is analyzed by the secondary control system (8) and is passed to the first control system (6) which controls the continuous multi-column system (2) in real time via local area network or any other communication protocol. The software layer of first control system (6) is able to control the flowrate of all pumps (20) and the positions of all valves (21,22) in the continuous multi-column chromatography system (2) in real time. Pneumatically or electronically controlled pumps (20) are used to supply the harvest, equilibration buffer, elution buffer, and cleaning buffer and wash buffer, respectively. Outlet ports of each outlet channels (5) led to the elution vessel, second-pass column, and the waste vessel. The timings and valve combinations for each PCC (Periodic counter current) step in the base method (Table 1) is programmed into the first control system (6) using Python code, with the option of dynamic time adjustment in the case of extreme deviations. Every three seconds, upon receiving concentration data from the NIR flow cells (7, 9) via second control system (8), the control algorithm decided whether or not to change the flowrate of the loading pump using the method described in the preceding section. Overall cycle time was also monitored by the Python software in order to make valve (21,22) open/close decisions according to the 3-column method.

Several cases are designed to test the real time control capabilities of the system. Three runs of four cycles each are conducted. Different types of concentration variations are induced in the feed, including abrupt step changes both within and outside the normal operating range, linear changes, and non-linear changes over different time intervals and with different gradients. These deviations are induced using a multichannel gradient valve (MCGV) and pump using ChemStation software from Agilent Technologies. The four-channel MCGV was supplied with harvest, concentrated mAb pool, HCP flow through pool, and water. These are mixed in different proportions to induce the required concentration variations. After mixing in the MCGV, the solution was directed to a surge tank maintained at 20 mL using the HPLC pump. From there, the multichannel continuous system (2) load pump is used to draw the solution through the NIR flow-through cell and into the multichannel continuous system (2).

The elution chromatograms are compared, and the aggregate content and concentration of the elution pools are measured using size exclusion chromatography. Analysis are being done using Superdex™ 200, 10 mm×300 mm high resolution column (GE Healthcare Biosciences, USA) operated at 25° C. on a Thermoscientific Dionex Ultimate 3000 HPLC unit (Thermo Scientific, USA) consisting of a quaternary pump with a degasser, an auto sampler with a cooling unit, and a variable wavelength detector (VWD). Isocratic elution was performed for 45 minutes at a flow rate of 0.5 mL/min with 50 mM phosphate buffer, 300 mM NaCl, and 0.05% NaN$_3$ at pH 7.0. The buffer is filtered with a 0.22 pm filter prior to use. UV absorbance is monitored at 280 nm. Chromeleon software (Thermo Scientific, USA) is used for control, data acquisition and analysis of chromatograms. An analytical standard was used to measure the product concentration in the elution samples.

The image of the setup in the present example is shown in FIG. 5. The control architecture in the present example is shown in FIG. 6, which illustrates the pumps and valves that are controlled by the Python layer in real time by the first control system (6). Pumps (10-14) are used to supply the feed material, equilibration buffer, elution buffer, cleaning buffer and wash buffer, respectively, to the three columns (4). Three of the multiple outlet ports (16-18) led to the elution vessel, second-pass column, and the waste vessel. The timings and valve combinations for each PCC step in the base method (Table 1) is programmed into the system using a scheduler module in Python, with the option of dynamic time adjustment in the case of extreme deviations. Every 3 seconds, the control algorithm received concentration data from one or both NIR flow cells (7, 9), and decided whether or not to stop the flow of the loading pump using the method described in the preceding section. In Setup B, the control algorithm also decided to switch the valve configuration to direct the flow-through material into the second pass column instead of the waste tank after a certain amount of mAb breakthrough was detected. Overall cycle time was also monitored by the Python software in order to conduct the normal PCC operation of the system (2), including all valves in the valve casette open/close and pump on/off and flowrate operations for all buffers at the correct times.

As shown in FIG. 7 and FIG. 8, the control system (2) response to induced variations in feed material concentration for case 1, case 2 and case 3 are described. FIG. 7 shows the control system response in Setup A. FIG. 8 shows the control system response in Setup B. These cases are designed to test the ability of the control system to handle different types of deviations and were tested for both Setup A (with single NIR flow cell (7)) and Setup B (with two NIR flow cells (7, 9). The deviations are designed to mirror potential harvest variations that could arise due to an upstream cell culture system. Variations in cell culture harvest may occur due to deviations in critical process parameters of the cell culture system such as pH, temperature, pressure or dissolved gases. For example, it has been shown that even a 0.1-point shift in pH can affect the harvest quality. Non-linarites in mixing of gas, liquid and solid phases may also lead to deviations. In a perfusion system, harvest titer will vary across different days of a perfusion campaign based on cell density, cell viability, age of the culture, perfusion retention mechanisms and other conditions affecting product expression. Also, feed material quality and concentration can deviate due to drift or errors in the control systems of the reactor or subsequent clarification steps. Cases 1 and 2 show how different variations in load concentration would be handled as long as they are within the system operating range. Since unpredictable errors outside the normal operating range can never be ruled out, the system response to extreme deviations in which the concentration suddenly dropped very low was tested in Case 3.

The acceptable range for the harvest concentration was taken as 3 mg/mL to 8 mg/mL. In the case of extreme deviations where the concentration falls below the normal operating range within which the method has been built, the NIR system should still be able to quantify the concentration of the incoming harvest and respond appropriately. In this case, if the harvest concentration falls below 3 mg/mL, then it is not possible to complete the loading in 40 minutes while maintaining the required residence time of 2.5 minutes with a loading flowrate of 6.7 mL/min. In this case, it is up to the process engineer to decide whether to dynamically adjust the PCC method timings and allow loading up to the desired amount, or whether to proceed with the under-loaded column in order to maintain the established column cycling times. The decision can be taken depending on whether the downstream process is sensitive to delays in the elution, for example if scheduled volumes of Protein A elute are required for loading into subsequent cycles of anion/cation exchange chromatography. This is often the case in continuous processing, where scheduling of process volumes is critical as there is no hold time between unit operations, unlike in batch processing. In the first case, PCC method timings must be dynamically adjusted to extend the loading time in the case of low concentration until the required amount (701.4 mg) of protein is loaded in the column at 6.7 mL/min. This is achieved by performing a corresponding increase in time of the second pass and the re-equilibration steps of the other two columns so as to maintain the PCC cycle. In the second case, the loading is simply switched to the next column after the 40 minutes loading time has elapsed, regardless of under-loading. In the studies presented below, both alternatives are shown. The first option of dynamic method time adjustment is demonstrated for Setup A, while the second option of continuing with the normal scheduled operations is demonstrated for Setup B.

3.1. Case 1: Step Changes in Product Concentration in Load

A case study with four loading cycles was designed to study the system response to abrupt changes in load concentration. In the first cycle, the load concentration is constant at 5.1 mg/mL of mAb. In Setup A, the load concentration is monitored at the inlet only, and loading up to desired binding capacity of 701.4 mg is achieved in approximately 21 minutes. At this time, the controller pauses the loading until the 40-minute cycle is complete and a fresh column enters the loading zone, as shown in FIG. 7(a). In Setup B, very similar results are achieved by monitoring percentage breakthrough at the column outlet. It can be seen that breakthrough of approximately 80% is achieved when loading is completed at 21 minutes as shown in FIG. 8(a).

A drop in concentration from 5.1 mg/mL to 2.6 mg/mL is induced partway through the second cycle. Due to the hold-up volume of the intermediate surge tank, a nonlinear concentration gradient develops and is accurately measured in real-time by the NIR flow-through cell. Since the concentration has decreased, this time the loading pump is active for approximately 34 minutes out of the 40-minute cycle in both Setups A and B, after which it is paused. Several other concentration changes are introduced, and similar responses are achieved.

3.2. Case 2: Linear Variation in Product Concentration in Load

In this case, a long linear concentration gradient was induced across four loading cycles. Concentration was increased from 2.6 mg/mL to 4.2 mg/mL. For Setup A, it can be seen in FIG. 7(b) that the NIR flow cell is able to accurately track this concentration gradient and complete loading up to the desired amount by pausing at the correct time in all four cycles. As concentration increases, the pause times are also seen to correspondingly increase. In the case of Setup B as shown in FIG. 8(b), the breakthrough curves are accurately measured in all four cycles and show 70-85% breakthrough when loading is completed. Since the load concentration is constantly increasing, the absolute concentration in the flow through at 70% breakthrough can also be seen to increase for each cycle, from 2.2 mg/mL in the first cycle to 3.1 mg/mL in the fourth cycle.

Case 3: Handling Extreme Deviations Outside the Normal Operating Range, and Nonlinear Deviations A robust control system must allow for rare extreme deviations, enabling the system to run continuously until these can be resolved upstream. A potential rare deviation is a sudden drop in harvest concentration due to errors in the control of the perfusion system, leading to severe reduction in the expression of the target protein due to cell nutritional imbalances or death. Even in such cases, it may be possible to bring the system back within normal operating limits without stopping the entire continuous train, if the downstream steps can adapt to the deviation for a certain amount of time and continue operating at reduced efficiency. It is up to the process engineer whether to prioritize resin utilization or process scheduling. The present system allows for both options. Extreme deviation handling by adjusting PCC method timings has been demonstrated for Setup A, while Setup B has been used to demonstrate the alternative approach.

A sudden extreme deviation was induced in the second cycle. Harvest concentration dropped suddenly from 5.1 mg/mL to 1 mg/mL, which is below the critical lower concentration limit of 2.6 mg/mL for the current method and system constraints. Thus, in order to load the correct amount of protein, more time was dynamically added to the loading cycle until the desired amount of loading was complete, as shown in FIG. 7(c). The durations of the second pass and re-equilibration steps in the other columns were automatically increased by the same amount of time to maintain time-matching in the PCC method. These decisions were all made dynamically in real time without any manual intervention from the operator. In the third cycle, another change was induced, increasing the harvest concentration from 1 mg/mL to 1.6 mg/mL. Extra loading time was added in a similar manner to the first cycle.

The alternative approach was used in Setup B. It can be seen from the breakthrough curves of the second and third cycles in FIG. 8(c) that the breakthrough levels are less than 10% and the total amount of protein loaded is also significantly less than 701.4 mg when the 40-minute loading time is complete. Only 333 and 427 mg, respectively, are loaded into the columns in cycles 2 and 3. In spite of being under-loaded, the columns are cycled based on the original PCC schedule.

This is done to ensure consistency in elution times despite sub-optimal resin utilization. Since such deviations outside the normal operating range of the system would rarely occur, handling a few cycles in this manner is not likely to have much impact on the resin productivity. However, if such deviations begin happening frequently due to upstream perturbations, it is advisable to re-design the PCC method by changing column flow-rates or sizes to facilitate loading up to the desired amount even at these concentrations, rather than to run many cycles in this sub-optimal manner.

The response of the system to nonlinear concentration gradients was tested in the third and fourth cycles. The concentration values measured by the NIR flow through cell can be seen to deviate in the steepest parts of the concentration gradient before settling at the final correct value, due to the hold-up volume of the intermediate surge tank and the flow through cell. The measured load and breakthrough concentrations can be seen to match the trend of the induced changes in both Setups A and B.

FIG. 9 shows the elution chromatograms of all 24 cycles and Table 2 indicates the elution comparison for the 24 cycles in terms of yield and critical quality attributes in accordance with FIGS. 7 and 8.

The elution pools of all 24 loading cycles were compared for consistency and the results are summarized in Table 2. Concentration and aggregate content are the two critical quality attributes which could potentially be affected by the protein A chromatography process. Thus, it is critical to ensure that the control methodology does not adversely impact the impurity clearance. The concentration and aggregate content of the complete elution pools were measured with size exclusion chromatography and are compared in Table 2. Percentage yield is also calculated, based on the milligrams of protein loaded in each cycle (701.4 mg whenever the system is within the normal operating range).

The quality attributes are well maintained in both Setups A and B. Concentration of the complete elution pools were in the range 4.6 mg/mL to 5.3 mg/mL in all elutions except for those from the second and third cycles of Case 3, where extreme low concentration deviations of 1 mg/mL load caused a reduction in the dynamic binding capacity from 42 mg/mL to ~35 mg/mL (estimated from FIG. 4). Overall yields of >93% were consistently achieved except for the extreme deviation cycles.

Key Differences Between Setup A and Setup B

Setup A had a single NIR flow cell (7) and Setup B had two NIR flow cells (7, 9). The key differences and advantages of the second mode of operation are as follows. The main difference is that in this case, instead of continuous flow to the second pass column, flow was only directed to the second pass column once 1% breakthrough was detected. This ensures minimal fouling of the second column as the contaminant material in the flow-through of the first column is only directed into the second column when the stream also contains product, and otherwise the flow-through (with <1% product) is directed to the waste stream. This system also allows resin health to be monitored in real time, as breakthrough will occur earlier if resin binding capacity has decreased due to fouling, compaction, or other mechanisms.

Although the subject matter has been described in considerable detail with reference to exemplary embodiments thereof, other embodiments are possible. As such, the scope of the subject matter should not be limited to the description of the embodiments contained therein.

We claim:

1. A system configured for monitoring and control of concentration of a bio-molecule in a chromatography apparatus, the system comprising:
   a reservoir configured for storing a feed material containing the bio-molecule;
   a continuous multi-column chromatography system comprising:
      a plurality of fluid transmission channels and a plurality of control-system-operable pumps, where each fluid transmission channel is connected to a corresponding one of the plurality of control-system-operable pumps at an inlet configured for regulating and controlling a flow of a fluid within each channel, wherein one of the plurality of fluid transmission channels is a feed material feeding channel; and
      a plurality of columns, each column having a column inlet and a column outlet, wherein each column inlet is connected through a corresponding one of a plurality of first pneumatically or electronically actuated valves of the fluid transmission channels to a corresponding one of the control-system-operable pumps and each column outlet is connected to a plurality of outlet ports by a plurality of second pneumatically or electronically actuated valves;
   a first control system connected to the continuous multi-column chromatography system and configured for operating the plurality of control-system-operable pumps and the plurality of first and second pneumatically or electronically actuated valves to supply the feed material from the reservoir to the plurality of columns;
   one or more near-infrared (NIR) flow cells configured for obtaining NIR spectroscopy data of the feed material in the feed material feeding channel and of fluids exiting the column outlets; and
   a secondary control system in communication with the one or more NIR flow cells and the first control system and configured for analyzing the NIR spectroscopy data and to determine the concentration of the bio-molecule in the feed material and the concentration of the bio-molecule in the fluids exiting the column outlets, and transferring the analyzed NIR spectroscopy data to the first control system; wherein
   the first control system continuously processes the NIR spectroscopy data to change valve configuration, pump actuation, flow rate of the feed material or a fluid through one or more of the plurality of fluid transmission channels to carry out steps including loading, second-pass loading, wash, elution, cleaning, regeneration, and equilibration to increase resin utilization, reduce idle time, or take control actions to handle system errors.

2. The system of claim 1, wherein the bio-molecule is a protein or peptide.

3. The system of claim 1, wherein the fluid is an equilibration buffer, elution buffer, cleaning buffer or washing buffer.

4. The system of claim 1, wherein the first control system and the secondary control system comprise a computer, distributed control system or processing device.

5. The system of claim 1, wherein one of the plurality of fluid transmission channels is an equilibration buffer transmission channel.

6. The system of claim 1, wherein one of the plurality of fluid transmission channels is an elution buffer transmission channel.

7. The system of claim 1, wherein one of the plurality of fluid transmission channels is a cleaning buffer transmission channel.

8. The system of claim 1, wherein one of the plurality of fluid transmission channels is a washing buffer transmission channel.

9. The system of claim 1, wherein the continuous multi-column chromatography system is operable in an isocratic operation.

10. The system of claim 1, wherein the continuous multi-column chromatography system is operable in a gradient operation.

11. The system of claim 1, wherein the continuous multi-column chromatography system is compatible with organic solvents.

12. The system of claim 1, wherein the continuous multi-column chromatography system is compatible with aqueous solutions.

13. The system of claim 1, wherein the continuous multi-column chromatography system is compatible with mixtures of organic solvents and aqueous solutions.

* * * * *